United States Patent
Nose et al.

(10) Patent No.: US 10,740,092 B2
(45) Date of Patent: Aug. 11, 2020

(54) PROTECTION AND CONTROL SYSTEM

(71) Applicants: Kabushiki Kaisha Toshiba, Minato-ku (JP); Toshiba Energy Systems & Solutions Corporation, Kawasaki-shi (JP)

(72) Inventors: Yotaro Nose, Tokyo (JP); Hironori Sakashita, Tokyo (JP); Koichi Okuno, Tokyo (JP); Tokujiro Takizawa, Kasukabe (JP)

(73) Assignees: Kabushiki Kaisha Toshiba, Minato-ku (JP); Toshiba Energy Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 16/345,415

(22) PCT Filed: Feb. 10, 2017

(86) PCT No.: PCT/JP2017/004883
§ 371 (c)(1),
(2) Date: Apr. 26, 2019

(87) PCT Pub. No.: WO2018/083815
PCT Pub. Date: May 11, 2018

(65) Prior Publication Data
US 2019/0272167 A1    Sep. 5, 2019

(30) Foreign Application Priority Data
Nov. 1, 2016 (JP) ................... 2016-214391

(51) Int. Cl.
*G06F 9/445* (2018.01)
*H04L 29/08* (2006.01)
(Continued)

(52) U.S. Cl.
CPC ............... *G06F 8/656* (2018.02); *G06F 8/60* (2013.01); *G06F 8/65* (2013.01); *G06F 8/658* (2018.02);
(Continued)

(58) Field of Classification Search
CPC .. G05B 2219/23306; G05B 2219/2614; G05B 13/028; G05B 19/4183;
(Continued)

(56) References Cited

U.S. PATENT DOCUMENTS 8,793,480 B2 * 7/2014 Aldereguia ............... G06F 8/65
                                                        713/1
8,966,235 B2 * 2/2015 Dicks ........................ G06F 8/61
                                                        713/2

(Continued)

FOREIGN PATENT DOCUMENTS

JP    2016-25799 A    2/2016

OTHER PUBLICATIONS

Panta et al., Efficient incremental code update for sensor networks, 32 pages (Year: 2011).*

(Continued)

*Primary Examiner* — Thuy Dao
(74) *Attorney, Agent, or Firm* — Oblon, McClelland, Maier & Neustadt, L.L.P.

(57) ABSTRACT

A protection and control system which is capable of surely updating a program without a program update by an operator and without deactivating a power system is provided. A protection and control device 1 includes an update accepting unit 1c that determines whether or not to accept the update of the program from a managing server 3, and an updating processing unit 1d that receives an updating program and that updates the program. The managing server 3 includes an update determining unit 3c that determines whether or not a
(Continued)

| IDENTIFICATION NUMBER | OWNER | SOFTWARE | EMAIL ADDRESS |
|---|---|---|---|
| X1 | Y1 | Z1 | xxx@yyy |
| X2 | Y1 | Z2 | xxx@yyy |
| X3 | Y2 | Z3 | xxx@yyy |
| X4 | Y2 | Z3 | xxx@yyy |
| X5 | Y3 | Z4 | xxx@yyy | supplied update program is for updating the program of the predetermined protection and control device 1, a transmitting unit 3b that transmits an update notification to the protection and control device 1 on which the program to be updated is loaded, and a receiving unit 3a that receives a reply to the update notification from the protection and control device.

8 Claims, 8 Drawing Sheets

(51) Int. Cl.
*B60K 7/00* (2006.01)
*B62M 6/45* (2010.01)
*G06F 9/44* (2018.01)
*G06F 8/656* (2018.01)
*G06F 8/658* (2018.01)
*G06F 9/54* (2006.01)
*G06F 21/57* (2013.01)
*H02H 3/05* (2006.01)
*G06F 8/65* (2018.01)
*G06F 11/00* (2006.01)
*H02H 3/02* (2006.01)
*G06F 8/60* (2018.01)
*H02J 13/00* (2006.01)

(52) U.S. Cl.
CPC .............. *G06F 9/445* (2013.01); *G06F 9/542* (2013.01); *G06F 11/00* (2013.01); *G06F 21/57* (2013.01); *H02H 3/02* (2013.01); *H02H 3/05* (2013.01); *H02J 13/00* (2013.01); *Y02E 60/725* (2013.01); *Y04S 10/20* (2013.01)

(58) Field of Classification Search
CPC .......... G05B 19/4184; G05B 19/41845; G05B 19/4185; G05B 15/02; G05B 13/02; G05B 19/02; G06F 8/656; G06F 8/658; G06F 8/60; G06F 8/65; G06F 9/445; G06F 9/542; G06F 11/00
See application file for complete search history.

(56) References Cited

U.S. PATENT DOCUMENTS

| | | | |
|---|---|---|---|
| 2010/0191884 A1* | 7/2010 | Holenstein | G06F 11/2094 710/200 |
| 2010/0198955 A1* | 8/2010 | Maruyama | G06F 8/65 709/223 |
| 2013/0293559 A1* | 11/2013 | Liu | G06T 1/60 345/530 |
| 2014/0214218 A1* | 7/2014 | Eldridge | H02J 13/00 700/286 |
| 2015/0074658 A1* | 3/2015 | Gourlay | F24F 11/62 717/172 |
| 2015/0113521 A1* | 4/2015 | Suzuki | G06F 8/65 717/173 |
| 2016/0009179 A1* | 1/2016 | Biderman | B60Q 5/005 701/22 |
| 2017/0039372 A1* | 2/2017 | Koval | G01D 4/004 |
| 2018/0081670 A1* | 3/2018 | Caushi | G07C 5/00 |

OTHER PUBLICATIONS

International Search Report dated Apr. 25, 2017 in PCT/JP2017/004883 filed on Feb. 10, 2017.

* cited by examiner

| IDENTIFICATION NUMBER | OWNER | SOFTWARE | EMAIL ADDRESS |
|---|---|---|---|
| X1 | Y1 | Z1 | xxx@yyy |
| X2 | Y1 | Z2 | xxx@yyy |
| X3 | Y2 | Z3 | xxx@yyy |
| X4 | Y2 | Z3 | xxx@yyy |
| X5 | Y3 | Z4 | xxx@yyy |

PROTECTION AND CONTROL SYSTEM

FIELD

Embodiments relate to a protection and control system applied to protect and control a switch and a circuit breaker installed in a power system.

BACKGROUND

An example known protection and control device that controls a switch and a circuit breaker to protect a power system is disclosed in Patent Document 1. This type of protection and control device has a built-in computer program. This computer program needs an update for a program version-up and for a change in control scheme.

CITATION LIST

Patent Literatures

Patent Document 1: JP 2016-25799 A

SUMMARY

The update of the program of the protection and control device has been needed to be executed under a condition in which the operation of the protection and control device is deactivated. Since safeness of a power system is not ensured when the operation of the protection and control device is deactivated, it is also necessary to deactivate the power system. The deactivation of the power system is not desirable because it forces a black-out for power consumers.

Moreover, the update of the computer program of the protection and control device is normally executed manually by an operator at a site where the protection and control device is installed. The work by the operator at the site needs a time for the updating work, is cumbersome, and involves a possibility of an error in the work. Moreover, it takes a time to grasp the update status of the program of the protection and control device.

An objective of an embodiment is to provide a protection and control system capable of surely updating a program without a program update by an operator and without deactivating a power system.

A protection and control system according to an embodiment includes the following features.

(1) A protection and control device that includes an input-output unit which monitors a voltage or a current of a power system and which controls a switch installed in the power system, a storing unit that stores a program and update information of the program, and a transmission control unit connected to a communication network.

(2) A managing server that transmits a necessity of an update of the program and an updating program to the protection and control device via the communication network.

(3) The protection and control device further includes:
an update accepting unit that determines whether or not to accept the update of the program transmitted from the managing server; and
an updating processing unit that receives the updating program and that updates the program.

(4) The managing server includes:
an update determining unit that determines whether or not a supplied update program is for updating the program of the predetermined protection and control device;

a transmitting unit that transmits an update notification to the protection and control device on which the program to be updated is loaded; and
a receiving unit that receives a reply to the update notification from the protection and control device.

DETAILED DESCRIPTION

First Embodiment

[1-1. Structure]

A protection and control system according to a first embodiment will be described with reference to FIGS. 1 to 1$n$.

(1) Entire Structure of System

This protection and control system includes a plurality of protection and control devices 1 to 1$n$ (collectively referred to as the protection and control device 1 below) connected to a communication network 5, a managing server 3, and an external device 4 that supplies an update program. These devices mutually transmit and receive data via the communication network 5.

(2) Protection and Control Device 1

The protection and control device 1 controls opening and closing of a switch and a circuit breaker (unillustrated in the figure) which are installed in a power system, and protects the power system. The protection and control device 1 is installed near the power system for each switch and for each circuit breaker, is connected to each switch and to each circuit breaker, and is connected to the communication network 5.

The protection and control device 1 has the following functions.

(a1) Updating a program of the protection and control device 1.

(a2) Transmitting update information of the program of the protection and control device 1 to the managing server 3.

(a3) Monitoring the current and voltage of the power system, and causing the switch and the circuit breaker installed in the power system to be an open-circuit status when determining that there is an abnormality.

Figure 2:
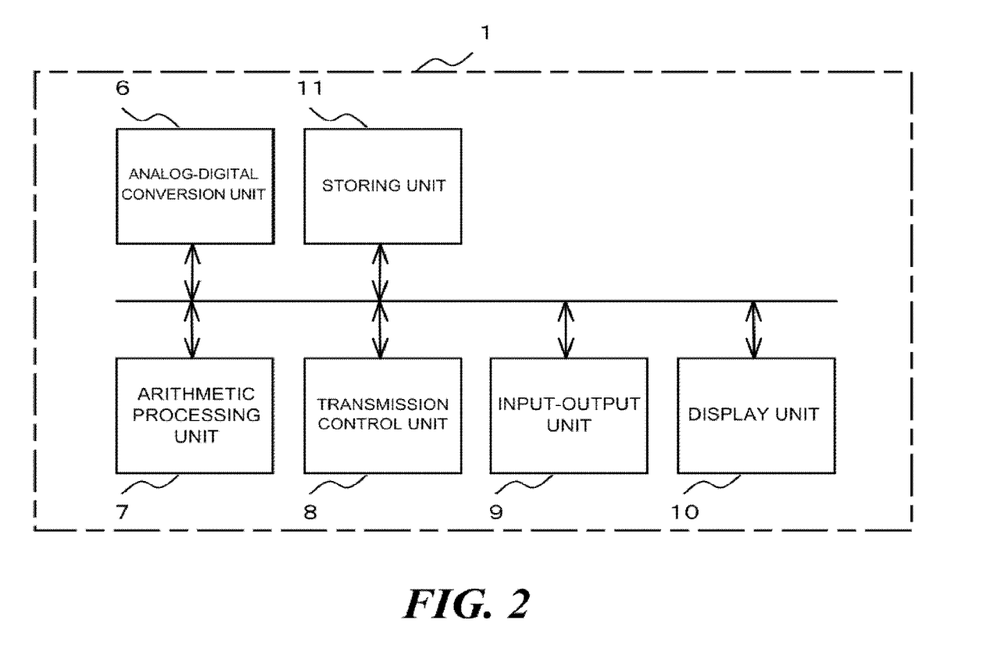
FIG. 2 is a diagram illustrating a hardware configuration of the protection and control device according to the first embodiment.

A hardware configuration of the protection and control device 1 will be illustrated in FIG. 2. Each protection and control device 1 includes an analog-digital conversion unit 6, an arithmetic processing unit 7, a transmission control unit 8, an input-output unit 9, and a display unit 10.

The analog-digital conversion unit 6 includes a semiconductor circuit for analog-digital conversion. A voltage or a current that is an electric quantity of the power system is input to the analog-digital conversion unit 6. The analog-digital conversion unit 6 performs sampling on input values of the voltage or current that is is an analog value, converts such input values into a digital value, and outputs the digital value to the arithmetic processing unit 7.

The arithmetic processing unit 7 includes a microcomputer. The arithmetic processing unit 7 is connected to the analog-digital conversion unit 6, the transmission control unit 8, the input-output unit 9, the display unit 10, and the storing unit 11 via a bus. The arithmetic processing unit 7 controls each of the above-described units, and executes the following operations.

(b1) Updating the program of the protection and control device 1 stored in the storing unit 11.

(b2) Controlling the transmission control unit 8, and transmitting the update information of the program of the protection and control device 1 to the managing server 3.

(b3) Monitoring the current and voltage of the power system which are informed from the analog-digital conversion unit 6, and controlling the input-output unit 9 to cause the switch and the circuit breaker installed in the power system to be a close-circuit status when determining that there is an abnormality.

The transmission control unit 8 includes a transmission circuit. The transmission control unit 8 is connected to the arithmetic processing unit 7 via the bus. The transmission control unit 8 is connected to the managing server 3 and the external device 4 via the communication network 5. The transmission control unit 8 is controlled by the arithmetic processing unit 7, and executes the following communications.

(c1) Receiving the updating program that is stored in the managing server 3.

(c2) Transmitting the update information of the program of the protection and control device 1 to the managing server 3.

(c3) Transmitting the update information of the program of the protection and control device 1 in response to a request by the external device 4.

The input-output unit 9 includes an interface circuit for external equipment. The input-output unit 9 is connected to the arithmetic processing unit 7 via the bus. The input-output unit 9 is connected to the switch and the circuit breaker which are the external equipment and which are installed in the power system. When the arithmetic processing unit 7 determines that the current and voltage of the power system are abnormal, the input-output unit 9 is controlled by the arithmetic processing unit 7 to output a contact signal for causing the switch and the circuit breaker to be the open-circuit status.

The display unit 10 includes a liquid crystal display device or LEDs. The display unit 10 is connected to the arithmetic processing unit 7 via the bus. The display unit 10 is controlled by the arithmetic processing unit 7, and displays the update information of the program of the protection and control device 1 and information stored in the protection and control device 1.

The storing unit 11 includes storage medium, such as a semiconductor memory or a hard disk. The storing unit 11 is connected to the arithmetic processing unit 7 via the bus. The storing unit 11 stores the followings.

(d1) Updated program.

(d2) Update information of program (a program version and an update date and time)

Figure 3:
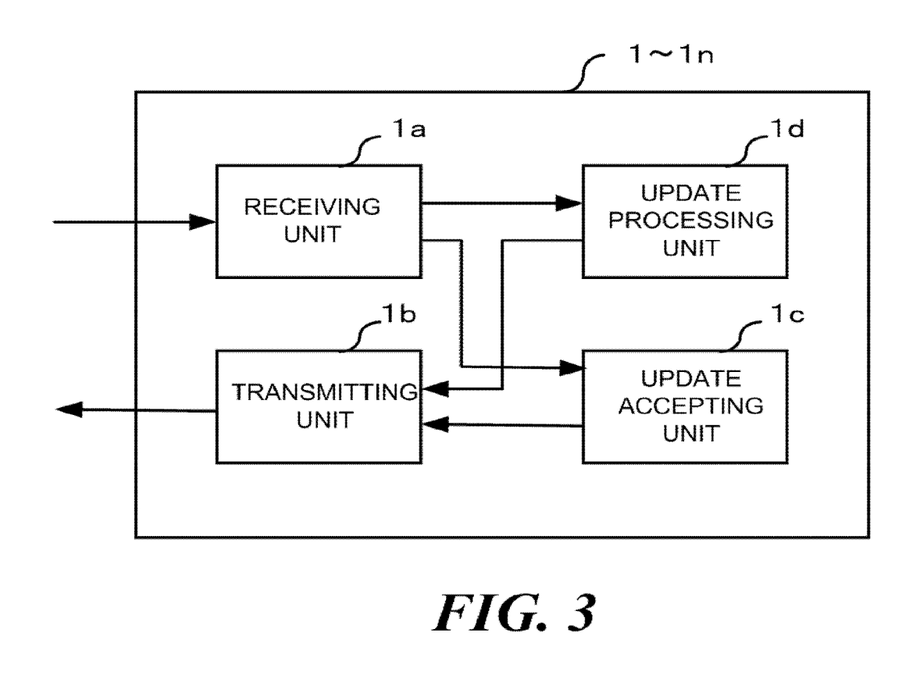
FIG. 3 is a functional block diagram of the protection and control device according to the first embodiment.

The protection and control device 1 that includes the hardware as illustrated in FIG. 2 includes respective units as illustrated in a functional block diagram of FIG. 3s.

(e1) A receiving unit 1a and a transmitting unit 1b that transmit and receive automatic update acceptance information, the update program, and the update information off the program, etc.

(e2) An update accepting unit 1c that determines whether or not to accept the update of the program that is presently executed by the protection and control device 1.

(e3) An updating processing unit 1d that installs the update program transmitted from the managing server 3.

(3) Managing Server 3

The managing server 3 includes hardware that is a combination of a computer, a storage device such as a hard disk, and a communication device. The managing server 3 is connected to the communication network 5. The managing server 3 is installed in an indoor site such as a power managing center.

Figure 4:
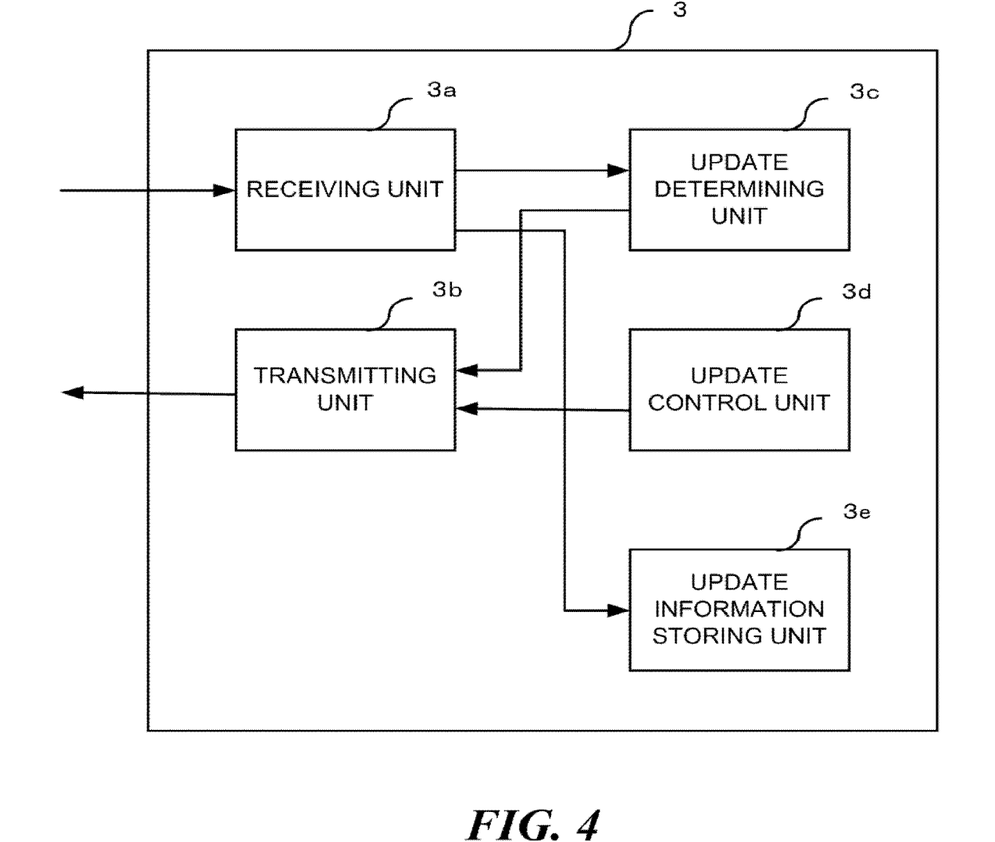
FIG. 4 is a functional block diagram of a managing server according to the first embodiment.

The managing server 3 has the following respective units as illustrated in a functional block diagram of FIG. 4.

(f1) A receiving unit 3a and a transmitting unit 3b that transmit and receive updating program, the update information of the program, and necessity of update, etc.

(f2) An update determining unit 3c that compares the program loaded in the protection and control device 1 with the updating program, and that determines whether or not the update of the program is necessary.

(f3) An update control unit 3d that controls an update timing of the plurality of protection and control devices 1.

(f4) An update information storing unit 3e that stores the update information of the program.

[3. External Device 4]

The external device 4 includes a personal computer with a communication function. The external device 4 is connected to the communication network 5. The external device 4 is installed in a user's office, etc. Moreover, although it is not illustrated, a supply device of the update program installed at a software supplier, etc., is also one of the external devices.

Figure 1:
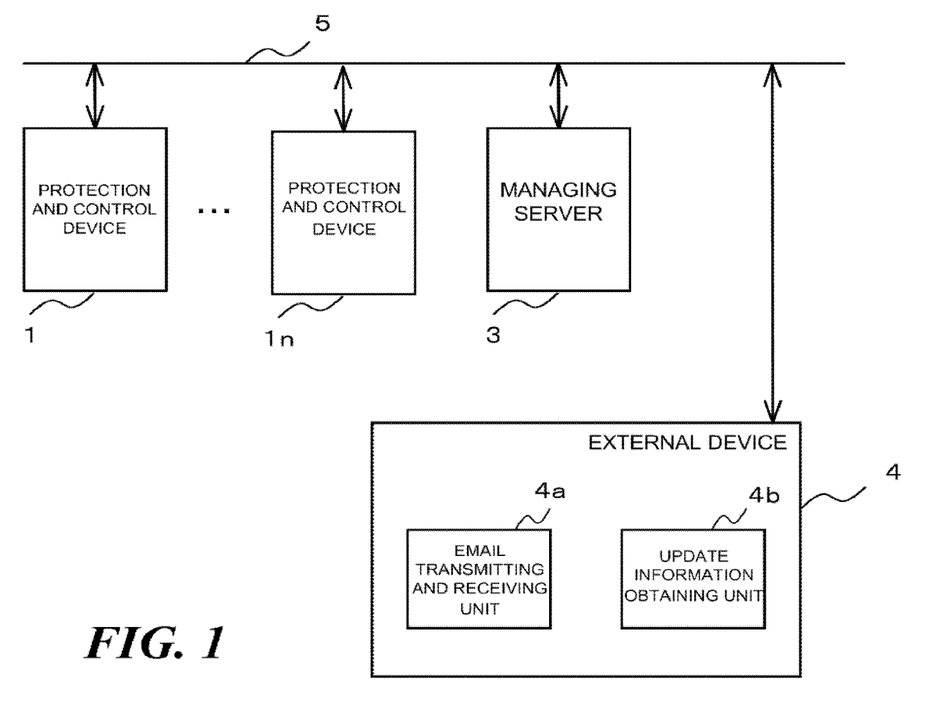
FIG. 1 is a diagram illustrating a protection and control system according to a first embodiment.

As illustrated in FIG. 1, the user's external device 4 has each of the following units.

(f1) An update information obtaining unit 4b that transmits a request to the managing server 3 and receives the update information of the program of the protection and control device 1.

(f2) An email transmitting and receiving unit 4a that receives the update information of the program of the protection and control device 1 and the necessity of the update from the managing server 3 by email.

[1-2. Action]

Figure 5:
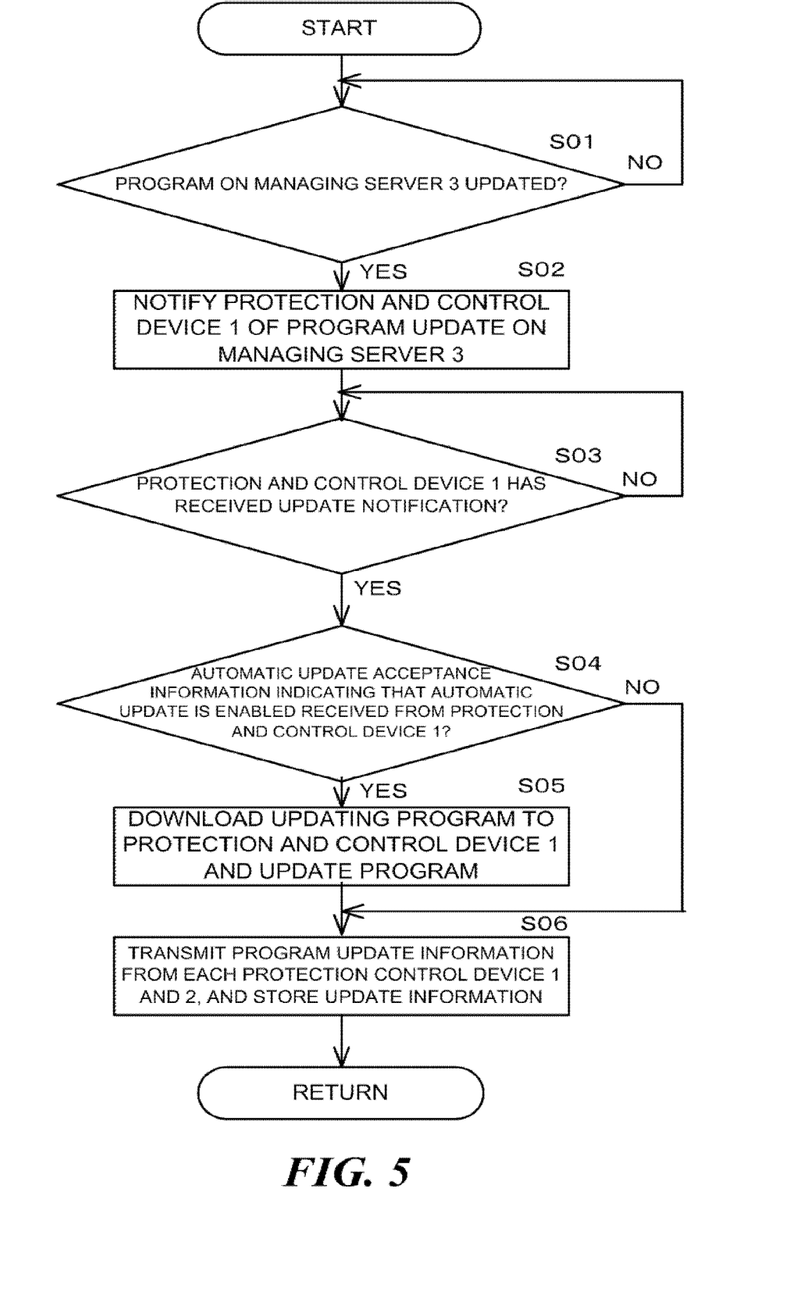
FIG. 5 is a diagram illustrating an operation flow of the protection and control system according to the first embodiment.

An outline of an operation of the protection and control system according to this embodiment will be described with reference to FIG. 5. FIG. 5 illustrates, as a flowchart, an operation sequence of the protection and control device 1 and the managing server 3.

(Step S01: Determining the Program Update of the Managing Server 3)

The update determining unit 3c provided in the managing server 3 determines whether or not the program of the managing server 3 has been updated. The program of the managing server 3 is automatically updated by the software supplier via the communication device of the managing server 3. When the update determining unit 3c determines that the program has been updated (S01: "YES"), the process progresses to step S02. In contrast, when the determination that the software is not updated is made (S01: "NO"), the managing server 3 waits for the update.

(Step S02: Notifying to the Protection and Control Device 1 from the Managing Server 3)

When the determination that the program of the managing server 3 has been updated is made in the step S01, the transmitting unit of the managing server 3 notifies the protection and control device 1 utilizing the corresponding program that the program of the managing server 3 has been updated.

(Step S03: Receiving an Update Notification by the Protection and Control Device 1)

Next, the managing server 3 determines whether or not the corresponding protection and control device 1 has received the update notification that has been notified in the step S02. That is, the receiving unit 1a of the protection and control device 1 replies a message to the effect that the notification has been received from the transmitting unit 1 when the notification of the program update has been received from the managing server 3. In response to the reply message, the receiving unit 3a of the managing server 3 determines whether or not the protection and control device 1 has received the update notification. When a determination that the protection and control device 1 has received the update notification is made (S03: "YES"), the process progresses to step S04. In contrast, when the determination that there is no reply from the protection and control device 1 is made (S03: "NO"), the managing server waits for receiving the reply.

(Step S04: Receiving Automatic Update Acceptance Information from the Protection and Control Device 1)

After the receiving unit receives the update notification from the managing server 3, the update accepting unit 1c of the protection and control device 1 determines whether or not to accept the update of the program presently executed by the protection and control device 1. For example, since the automatic update of the program by the protection and control device 1 is unabled when the arithmetic processing unit 7 is executing processes of monitoring the power system and controlling the switch, etc., the update accepting unit 1c checks the execution status of each program loaded in the protection and control device 1, and determines whether or not the program which has received the update notification is not executed and the update is enabled. When determining that the corresponding program is in an updatable status, the update accepting unit 1c transmits the automatic update acceptance information indicating the updatable status to the managing server 3 using the transmitting unit 1b.

When the determination that the receiving unit 3a of the managing server 3 has received the automatic update acceptance information which indicates the automatic update is enabled from the update accepting unit 1c of the protection and control device 1 is made (S04: "YES"), the process progresses to step S05. In contrast, when the determination that the receiving unit 3a of the managing server 3 has received the automatic update acceptance information indicating that the automatic update is unabled is made (S04: "NO"), the process progresses to step S06.

(Step S05: Updating the Program of the Protection and Control Device 1)

When the determination that the receiving unit 3a has received the automatic update acceptance information indicating that the automatic update of the program of the protection and control device 1 is enabled is made in the step S04, the transmitting unit 3b of the managing server 3 transmits the updating program to the protection and control device 1. The receiving unit 1a and updating processing unit 1d of the protection and control device 1 download the update program transmitted from the managing server 3, and execute the updating process on the program of the previous version that is utilized until this time.

When updating the program of the protection and control devices 1 in dual systems, in order to prevent the protection and control devices 1 from deactivating the system protection and control, the update control unit 3d of the managing server 3 controls the protection and control devices 1 to update the program of the protection and control device 1 one system by one system do that the updating process is not executed simultaneously in the two systems. For example, when updating the program of the protection and control devices 1 which are protecting the same segment, the setting of a protection and control device 2 for back-up protection is changed to operate as the protection and control device 1 for the primary protection during the update of the program of the protection and control device 1 for primary protection. As described above, the update control unit 3d of the managing server 3 controls the protection and control devices 1 in conjunction with each other.

On the other hand, in the protection and control device 1 that needs an opposing such as a PCM device, it is necessary to prevent an occurrence of a mismatch between the program of the protection and control device 1 at a local terminal and the program of the protection and control device 2 at the opposing terminal due to the update of the program, and to reduce the deactivation time for the system protection and control by the automatic update. Hence, the update control unit 3d of the managing server 3 simultaneously updates the program for not only the protection and control device 1 at the local terminal but also for the protection and control device 1 that is the opposing device. The updating process in these two protection and control devices 1 is simultaneously executed by the update control unit 3d of the managing server 3.

Furthermore, regarding the protection and control device 1 that is prohibited of updating the program due to the maintenance work, etc., the update control unit 3d of the managing server 3 controls the protection and control device 1 to not execute the updating process on the program. The protection and control device 1 that is prohibited of updating the program is set in the update control unit 3d of the managing server 3 by an operator.

(Step S06: Storing Program Update Information of the Protection and Control Device 1)

When the updating processing unit 1d completes the program update of the protection and control device 1 in the step S05, upon receiving the notification of the update completion from the updating processing unit 1d, the transmitting unit 1b of the protection and control device 1 transmits the update information of the program to the receiving unit 3a of the managing server 3. The update information of the program contains the version of the latest program and the update date and time of the program. The update information received by the receiving unit 3a is transmitted to the update information storing unit 3e of the managing server 3, and the update information storing unit 3e stores the update information of the program for each protection and control device 1.

In contrast, when the receiving unit 3a of the managing server 3 receives the automatic update acceptance information indicating that the automatic update is unabled from the protection and control device 1 in the step S04, the receiving unit 3a stores the update information of the program before the update and presently executed by the protection and control device 1 in the update information storing unit 3e. This enables the managing server 3 to compare the version and the update date and time between the update program received from the external software supplier, etc., and the program presently executed by the protection and control device 1, and to determine whether or not the received update program is already updated in the protection and control device 1.

[1-3. Effects]

(1) According to this embodiment, since the program can be updated from the managing server 3, the program of the protection and control device 1 can be updated without a deactivation of the power system. In particular, a program update work by an operator is unnecessary, the program update work is not cumbersome, and an error in work is reduced, so that the program of the protection and control device 1 can be surely updated. Moreover, the program update work at the installation site of the protection and control device 1 becomes unnecessary.

(2) Regarding the update program, when receiving the update program from the external device 4 such as the program supplier, etc., the managing server 3 causes the update determining unit 3c to determine which protection and control device 1 needs the received update program by referring to the update information storing unit 3e. Consequently, the appropriate update program for each protection and control device 1 can be selected, and the appropriate updating process can be executed.

(3) Since the managing server 3 transmits the updating program to the protection and control device 1 after receiving a reply to the update notification from the protection and control device 1 and the update acceptance information indicating the acceptance of the update, the program not appropriate for the updating process such as the program that is presently executed is prevented from being updated.

(4) Since the update control unit 3d executes the updating process for the plurality of protection and control devices 1 in conjunction with each other, an occurrence of any inconvenience within the protection and control devices due to the program update can be prevented.

[1-4. Modified Examples]

(1) Although the program of the managing server 3 is automatically updated by the software supplier, etc., via the communication device of the managing server 3 in the above-described embodiment, the program may be installed by an operator.

(2) The update control unit 3d of the managing server 3 may monitor and display the update information of the program of each protection and control device and a trip lock, etc., at certain cycle.

2. Second Embodiment

[2-1. Structure]

Figure 7:
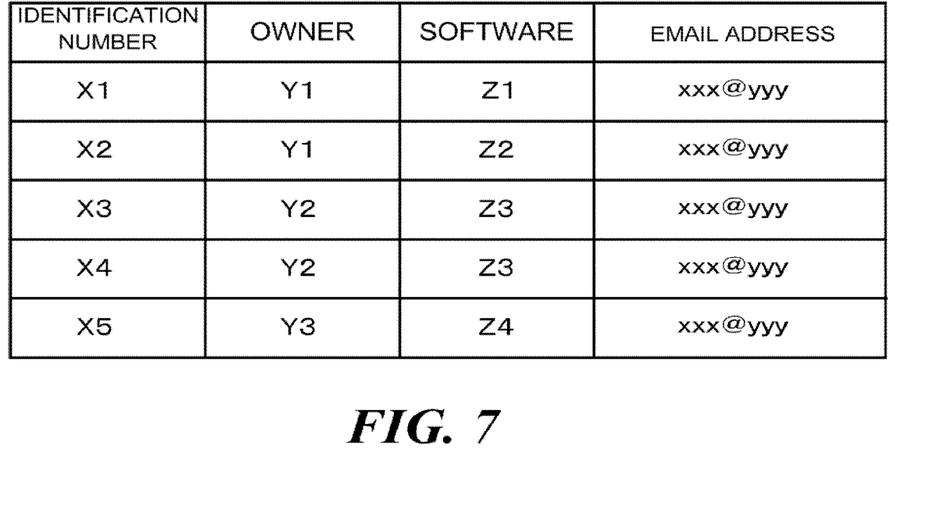
FIG. 7 is a diagram illustrating a data structure of the managing server according to the second embodiment.
Figure 8:
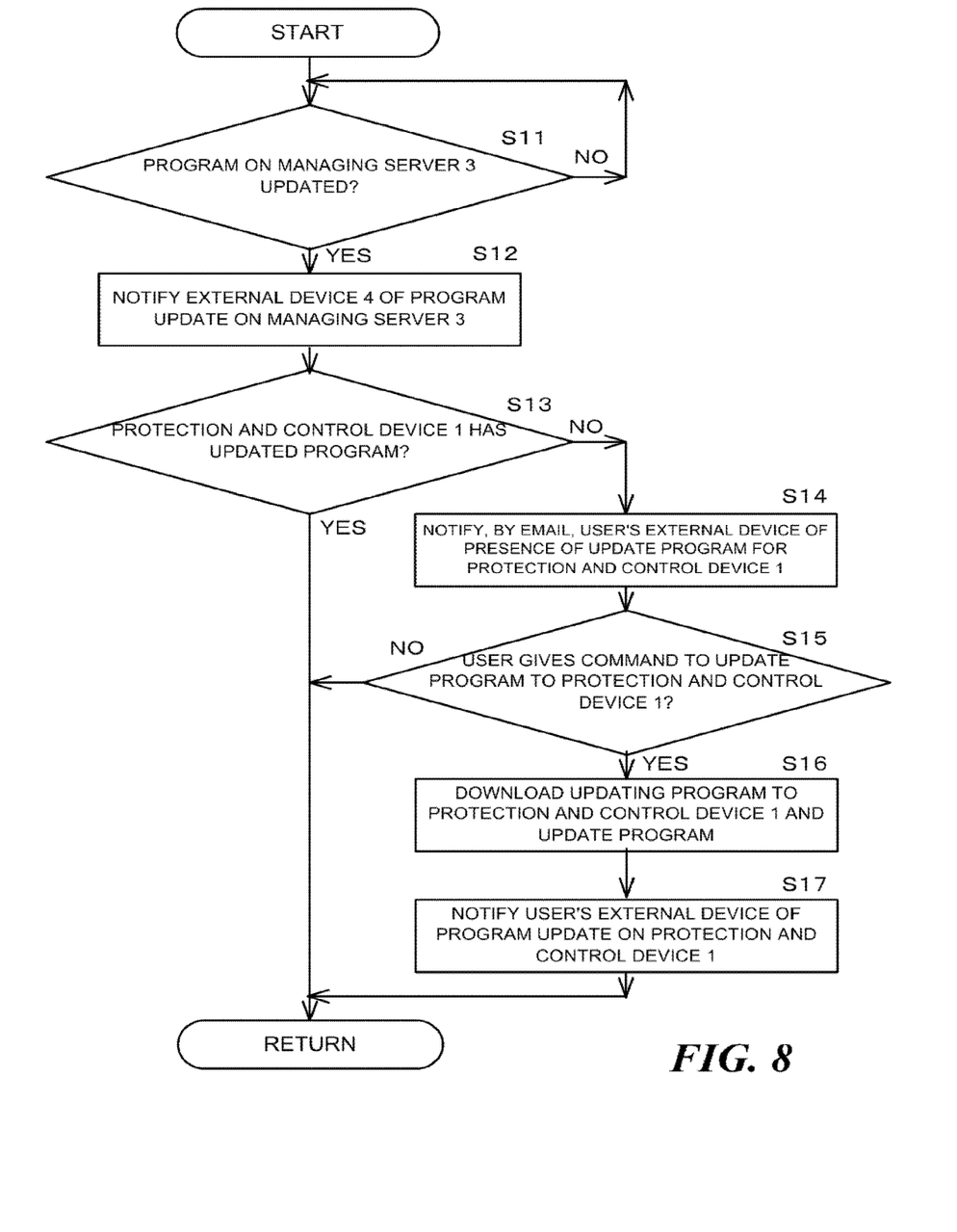
FIG. 8 is a diagram illustrating an operation flow of a protection and control system according to the second embodiment.

A second embodiment will be described with reference to FIGS. 6 to 8.

Figure 6:
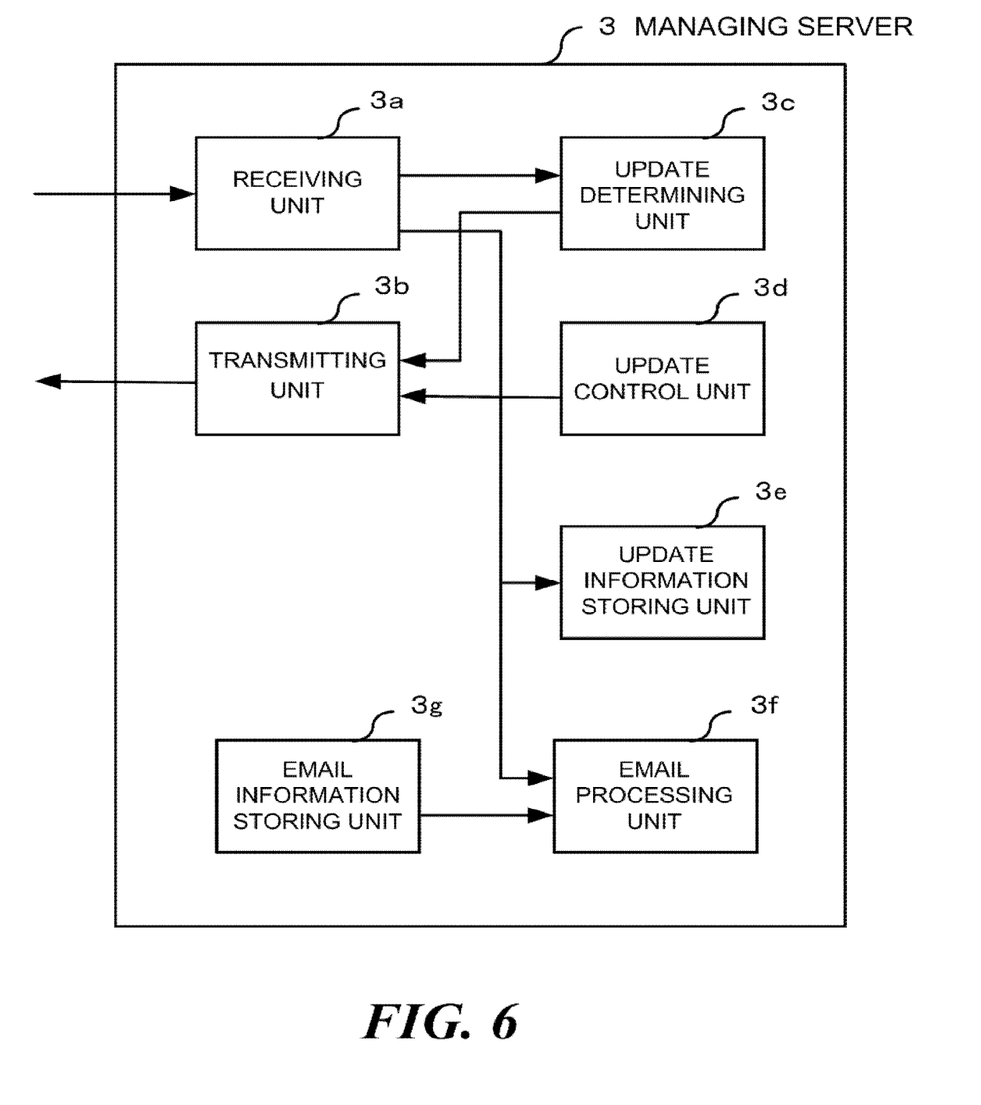
FIG. 6 is a functional block diagram of a managing server according to a second embodiment.

As illustrated in FIG. 6, this second embodiment differs from the first embodiment in that the managing server 3 includes an email processing unit 3f that can update the program of the protection and control device 1 from a remote site using an email. Moreover, data that are necessary for the email processing unit 3f, such as an owner, a software, and an email address, as illustrated in FIG. 7, are stored in an email information storing unit 3g.

[2-2. Action]

An outline of an operation of the protection and control system according to this embodiment will be described with reference to FIG. 8. FIG. 8 illustrates an operation sequence of the managing server 3 of the protection and control system as a flowchart.

(Step S11: Determining the Program Update on the Managing Server 3)

The update determining unit 3c of the managing server 3 determines whether or not the program on the managing server 3 has been updated. The program on the managing server 3 is automatically updated by the software supplier via the communication device of the managing server 3. When a determination that the program on the managing server 3 has been updated is made (S11: "YES"), the process progresses to step S12. In contrast, when the determination that the program is not updated is made (S11: "NO"), the managing server waits for the update.

(Step S12: Notifying to the User from the Managing Server 3)

When the determination that the program on the managing server 3 has been updated is made in the step S11, the email processing unit 3f of the managing server 3 transmits, to the user's external device 4 of the protection and control device 1 that is utilizing the corresponding program, an email indicating that the program of the managing server 3 has been updated based on the data stored in the email information storing unit 3g.

(Step S13: Determining whether or not the Update by the Protection and Control Device 1 is Executed)

Next, the update control unit 3d of the managing server 3 controls the corresponding protection and control device 1 to update the program. The update accepting unit 1c of the protection and control device 1 determines whether or not to update the program, and selects to update the program or not to update the program in accordance with this determination. The updating processing unit 1d of the protection and control device 1 transmits information indicating that the program has been updated or not updated to the managing server 3.

The managing server 3 stores the update information in the update information storing unit 3e like the first embodiment when receiving information indicating that the program has been updated or not updated transmitted from the protection and control device 1. Simultaneously, the email processing unit 3f of the managing server 3 transmits, by an email, information indicating that the protection and control device 1 has updated the program or not updated the program to the email transmitting and receiving unit 4a of the user's external device 4. When the protection and control device 1 has updated the program (S13: "YES"), the external device records such information in the update information obtaining unit 4b, and the operation sequence is completed. In contrast, when the protection and control device 1 does not update the program (S13: "NO"), the process progresses to step S14.

(Step S14: Notifying to the User's External Device of the Presence of the Update Program for the Protection and Control Device 1)

When the determination that the protection and control device 1 does not update the program is made in the step S13, the email processing unit 3f of the managing server 3 transmits an email indicating that "the program of the protection and control device 1 has not been updated to the latest program", and "there is the program for the protection and control device 1 which should be updated" to the user's external device 4 of the corresponding protection and control device 1.

(Step S15: Determining whether or not the User has given a Command to Update the Program for the Protection and Control Device 1)

Next, the managing server 3 determines whether or not the user has given a command to update the program for the protection and control device 1.

The user who has received the email indicating that "the program of the protection and control device 1 has not been updated to the latest program", and "there is the program for the protection and control device 1 which should be updated" at the external device 4 may desire the update of the program of the protection and control device 1. The user who desires the update of the program of the protection and control device 1 can command the protection and control device 1 by communication from the external device 4 to update the program.

Information indicating that the command to update the program is given from the user's external device 4 is transmitted from the protection and control device 1 to the managing server 3. The managing server 3 determines whether or not the user has given the command to update the program to the protection and control device 1 in accordance with the transmission from the protection and control device 1.

When a determination that the command to update the program update is given to the protection and control device 1 is made (S15: "YES"), the process progresses to step S16. In contrast, when the determination that the command to update the program is not given to the protection and control device 1 is made (S15: "NO"), the operation sequence is completed.

(Step S16: Updating the Program of the Protection and Control Device 1)

When the determination that the command to update the program is given to the protection and control device 1 is made in the step S15, the managing server 3 transmits the updating program to the protection and control device 1 to update the program. The updating processing unit 1d of the protection and control device 1 downloads the corresponding program from the managing server 3, and executes the updating process.

(Step S17: Notifying the user of the Update Completion of the Program of the Protection and Control Device 1 by Email)

Next, the email processing unit 3f of the managing server 3 transmits information indicating that the update of the program of the protection and control device 1 has been completed, and the update information to the email transmitting and receiving unit 4a of the external device 4 by an email. The external device 4 records these information of the program in the update information obtaining unit 4b.

[2-3. Effects]

(1) According to the protection and control system of this embodiment, by utilizing an email, since the user is informed of the necessity of the program update for the protection and control device 1, and the program of the protection and control device 1 is updated in accordance with a decision made by the user, an unintended operation of the protection and control system due to the program update can be further avoided. Moreover, by utilizing the email, since the user is informed of the necessity of the program update for the protection and control device 1, and the program can be updated from the user's external device 4 via the managing server 3, the user can update the program from the remote site.

[2-4. Modified Examples]

(1) In the embodiment, although the user who desires to update the program for the protection and control device 1 can give the command to update the program from the external device 4 to the protection and control device 1 by communication, a switch to give the command to update the program may be provided on a front panel of the protection and control device 1, and the program may be updated by depressing this switch.

(2) The user may be registered in the managing server 3 in advance, and the registered user may be enabled to access the managing server 3 from the external device 4 such as a personal computer, and to check the initial status and present status of the program of the protection and control device 1. After checking the present update status of the program of the protection and control device 1, the user may select the protection and control device 1 to individually update the program by transmitting the command from the external device 4. This enables the user to further grasp the update status of the program of the protection and control device 1 from the managing server 3 via the network by the user's external device 4.

(3) The user may be registered in the managing server 3 in advance, and the registered user may be enabled to access the managing server 3 from the external device such as a personal computer, and a status such as the trip lock of the protection and control device may be displayed on the user's external device 4. Alternatively, by operating an operation panel of the protection and control device, the status may be displayed on the display unit of the protection and control device 1. This enables the user to further grasp the status of the protection and control device 1 by display.

Other Embodiments

Although the embodiment that includes the modified examples has been described above, such embodiment is merely presented as an example, and is not intended to limit the scope of the present disclosure. Such embodiment can be carried out in other various forms, and various omissions, replacements, and modifications can be made thereto without departing from the scope of the present disclosure. Such embodiment and modified forms thereof are within the scope of the present disclosure, and also within the scope of the invention as recited in the appended claims and the equivalent range thereto. An example is as follows.

(1) In the above-described embodiment, although the program is updated in the protection and control system, the program contains a module which is an entire software or a part of the program, setting values, and other data.

REFERENCE SIGNS LIST 1 to 1n Protection and control device
1a Receiving unit
1b Transmitting unit
1c Update accepting unit
1d Updating processing unit
3 Managing server
3a Receiving unit
3b Transmitting unit
3c Update determining unit
3d Update control unit
3e Update information storing unit
3f Email processing unit
3g Email information storing unit
4 External device
4a Email transmitting and receiving unit
4b Update information obtaining unit
5 Communication network
6 Analog-digital conversion unit
7 Arithmetic processing unit
8 Transmission control unit
9 Input-output unit
10 Display unit
11 Storing unit

The invention claimed is:

1. A protection and control system comprising:
a protection and control device that comprises an input-output unit which monitors a voltage or a current of a power system and which controls a switch installed in the power system, a storing unit including a memory that stores a program and update information of the program, and a transmission control unit connected to a communication network; and
a managing server including a hardware processor that transmits a necessity of an update of the program and an updating program to the protection and control device via the communication network,
wherein the protection and control device further comprises:
an update accepting unit that determines whether or not to accept the update of the program transmitted from the managing server; and
an updating processing unit which receives the updating program and which updates the program,
wherein the managing server comprises:
an update determining unit that determines whether or not a supplied update program for updating the program of the predetermined protection and control device;
a transmitting unit that transmits an update notification to the protection and control device on which the program to be updated is loaded;
a receiving unit that receives a reply to the update notification from the protection and control device;
an email processing unit: and
an email information storing unit including a memory that is necessary to transmit and receive an email,
wherein the email processing unit notifies a user's external device connected to the communication network of the program to be updated via the communication network when the program on the managing server has been updated,
wherein when the update determining unit determines that the program on the managing server has been updated and the update accepting unit accepts the update of the program of the protection and control device,
the updating processing unit updates the program of the protection and control device when an email processing unit installed in the user's external device connected to the communication network gives a command to update the program to the protection and control device.

2. The protection and control system according to claim 1, wherein the managing server comprises the update determining unit that transmits the necessity of the update of the program and the updating program to the protection and control device when the program on the managing server has been updated.

3. The protection and control system according to claim 1, wherein the protection and control device comprises the update accepting unit that determines the necessity of the update of the program, and the update accepting unit transmits automatic update acceptance info' ration indicating that update is unabled to the managing server.

4. The protection and control system according to claim 1, wherein the managing server further comprises an update control unit that controls a plurality of the protection and control devices in conjunction with each other so as to avoid a simultaneous update when the plurality of the protection and control devices update the respective programs.

5. The protection and control system according to claim 1, wherein the email processing unit transmits an email indicating that the update of the program of the protection and control device is completed to the user's external device connected to the communication network.

6. The protection and control system according to claim 5, allowing the external device connected to the communication network which is owned by the user registered in the managing server in advance to check an initial status of the program of the protection and control device and a present status thereof.

7. The protection and control system according to claim 1, allowing an external device connected to the communication network which is owned by the user registered in the managing server in advance to check a status of a trip lock of the protection and control device.

8. The protection and control system according to claim 1, wherein when the update determining unit determines that the program on the managing server has been updated and the update accepting unit accepts the update of the program of the protection and control device,
the protection and control device updates the program when a command to update the program is given to a switch provided on a panel of the protection and control device.

* * * * *